Figure 12:
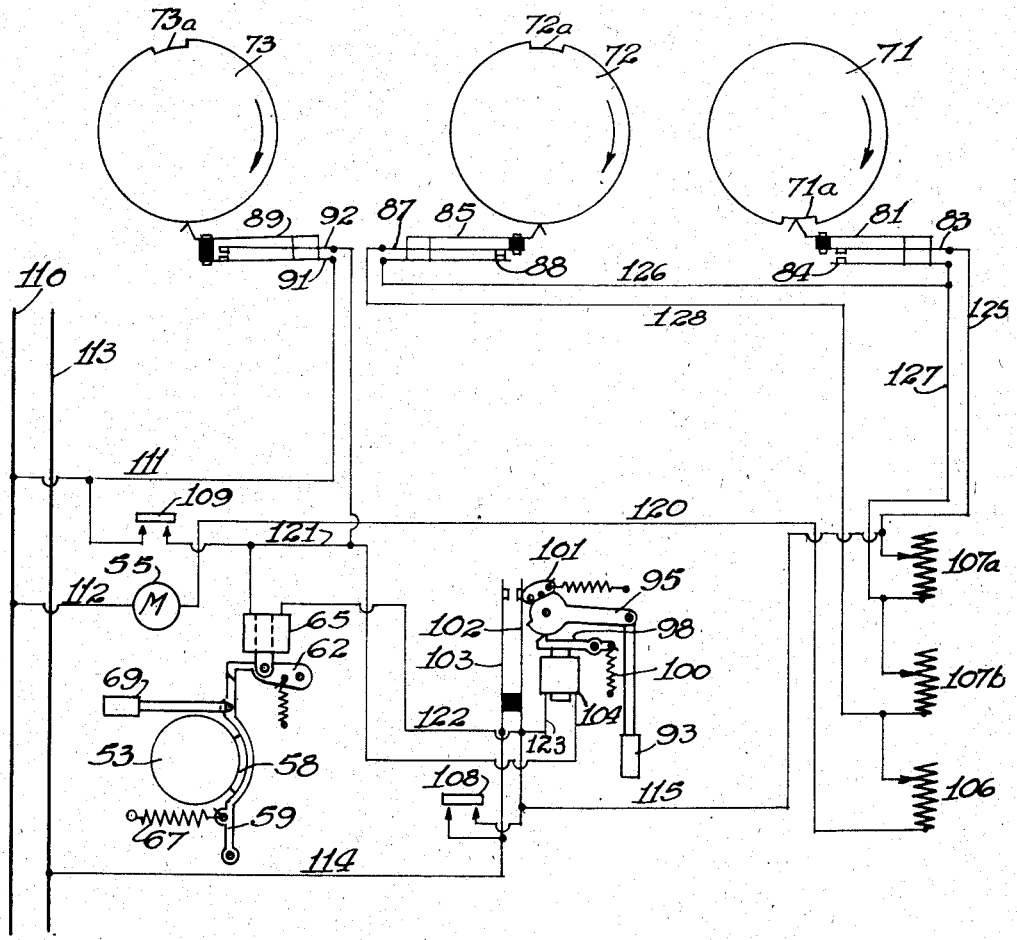

Dec. 15, 1942.　　F. N. JACOB ET AL　　2,305,085
MACHINE FOR WINDING ELECTRICAL COILS
Filed Oct. 4, 1940　　8 Sheets-Sheet 1
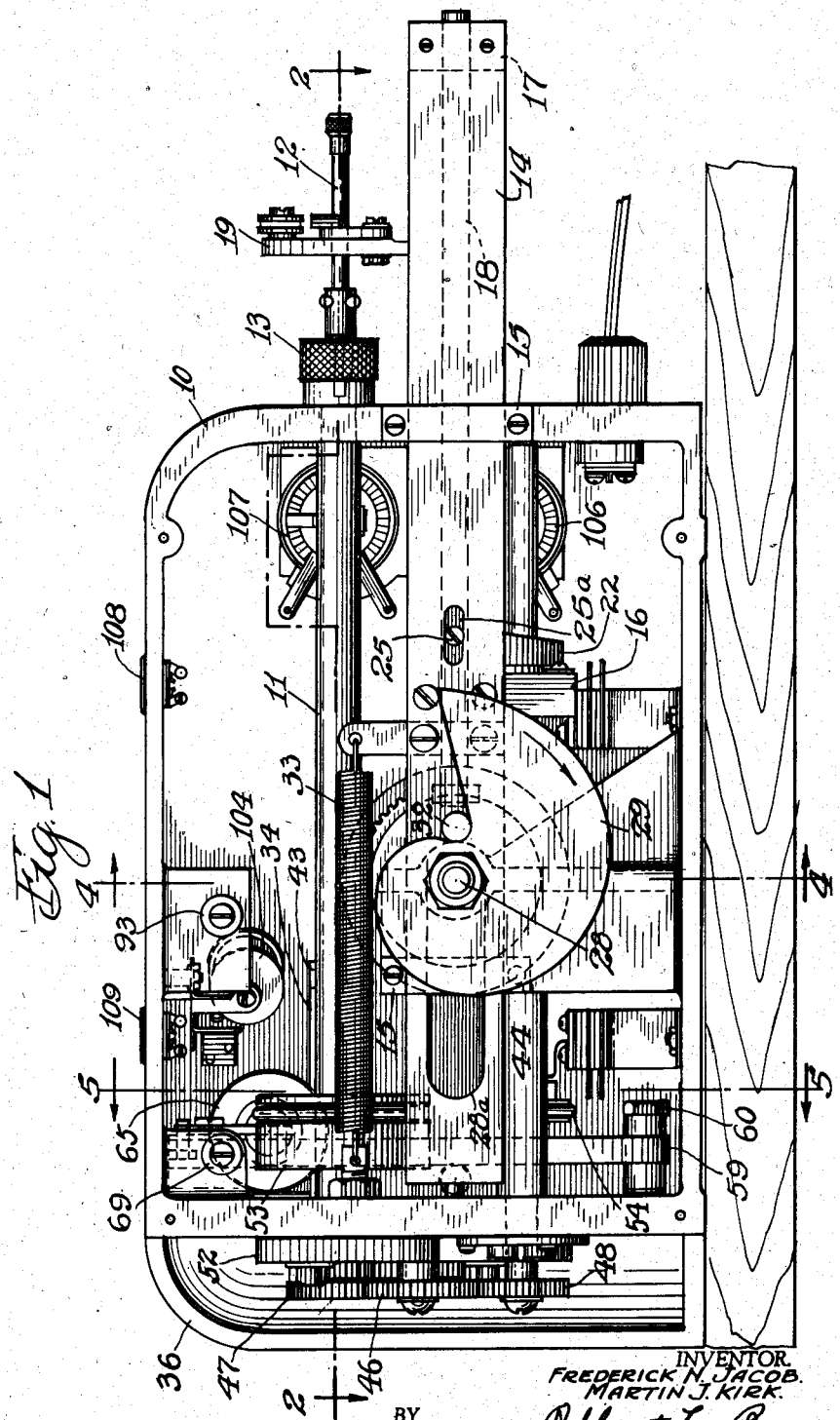
INVENTOR.
FREDERICK N. JACOB.
MARTIN J. KIRK.
BY
ATTORNEY.

Dec. 15, 1942.　　　F. N. JACOB ET AL　　　2,305,085
MACHINE FOR WINDING ELECTRICAL COILS
Filed Oct. 4, 1940　　　8 Sheets-Sheet 2
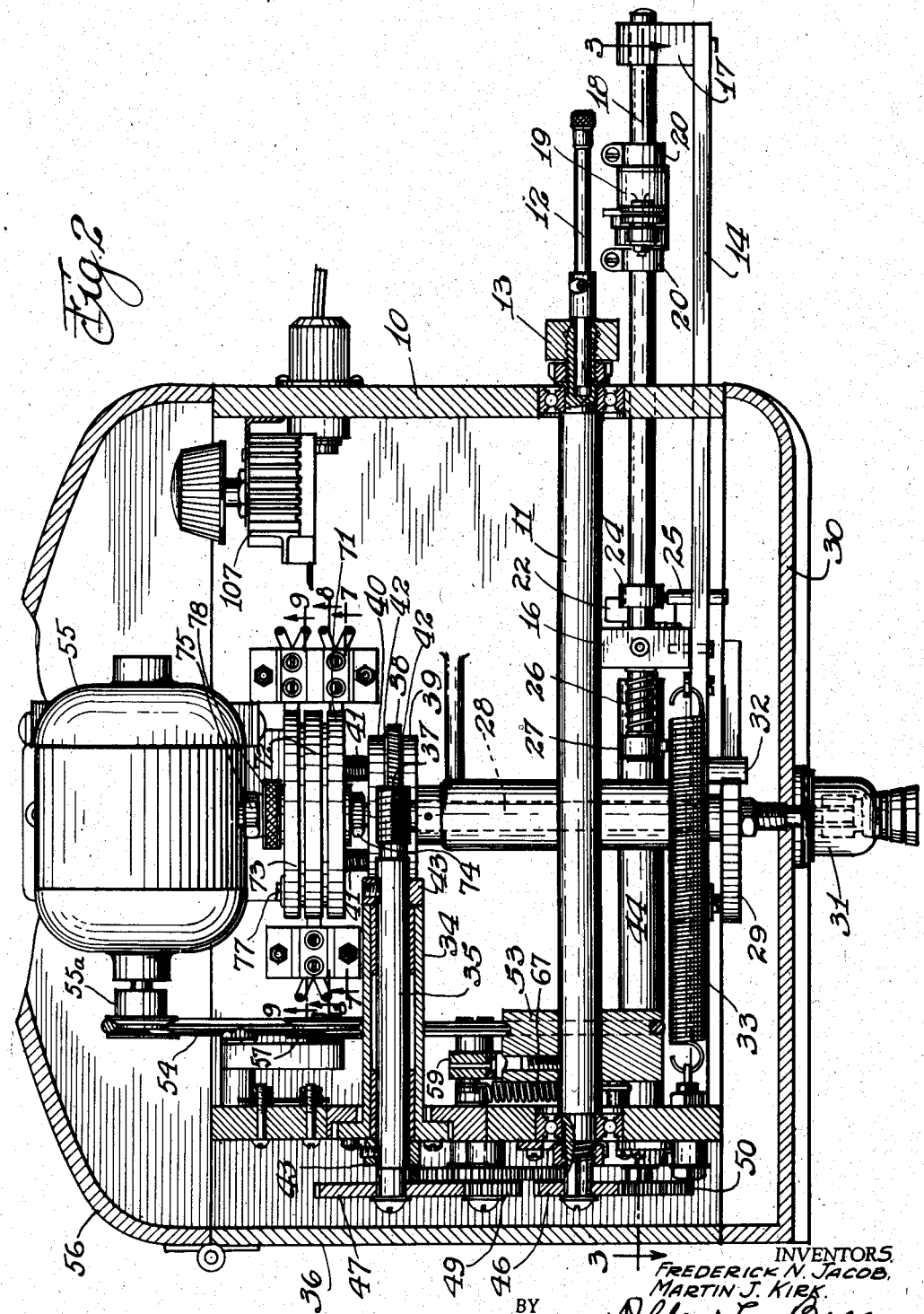
INVENTORS
FREDERICK N. JACOB,
MARTIN J. KIRK.
BY Albert E. Bell
ATTORNEY.

Dec. 15, 1942.  F. N. JACOB ET AL  2,305,085
MACHINE FOR WINDING ELECTRICAL COILS
Filed Oct. 4, 1940  8 Sheets-Sheet 3
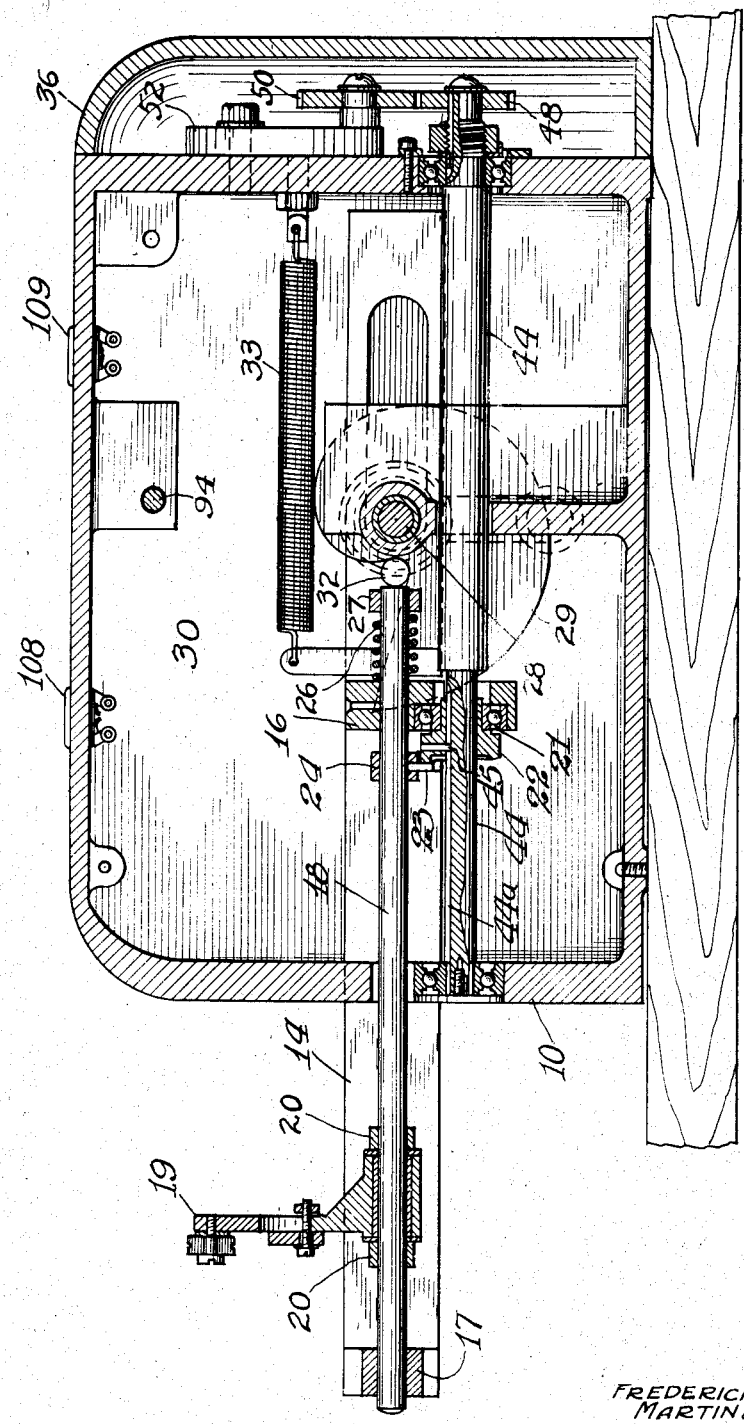
INVENTORS.
FREDERICK N. JACOB.
MARTIN J. KIRK.
BY
Albert C. Bree
ATTORNEY.

Dec. 15, 1942.   F. N. JACOB ET AL   2,305,085
MACHINE FOR WINDING ELECTRICAL COILS
Filed Oct. 4, 1940   8 Sheets-Sheet 4
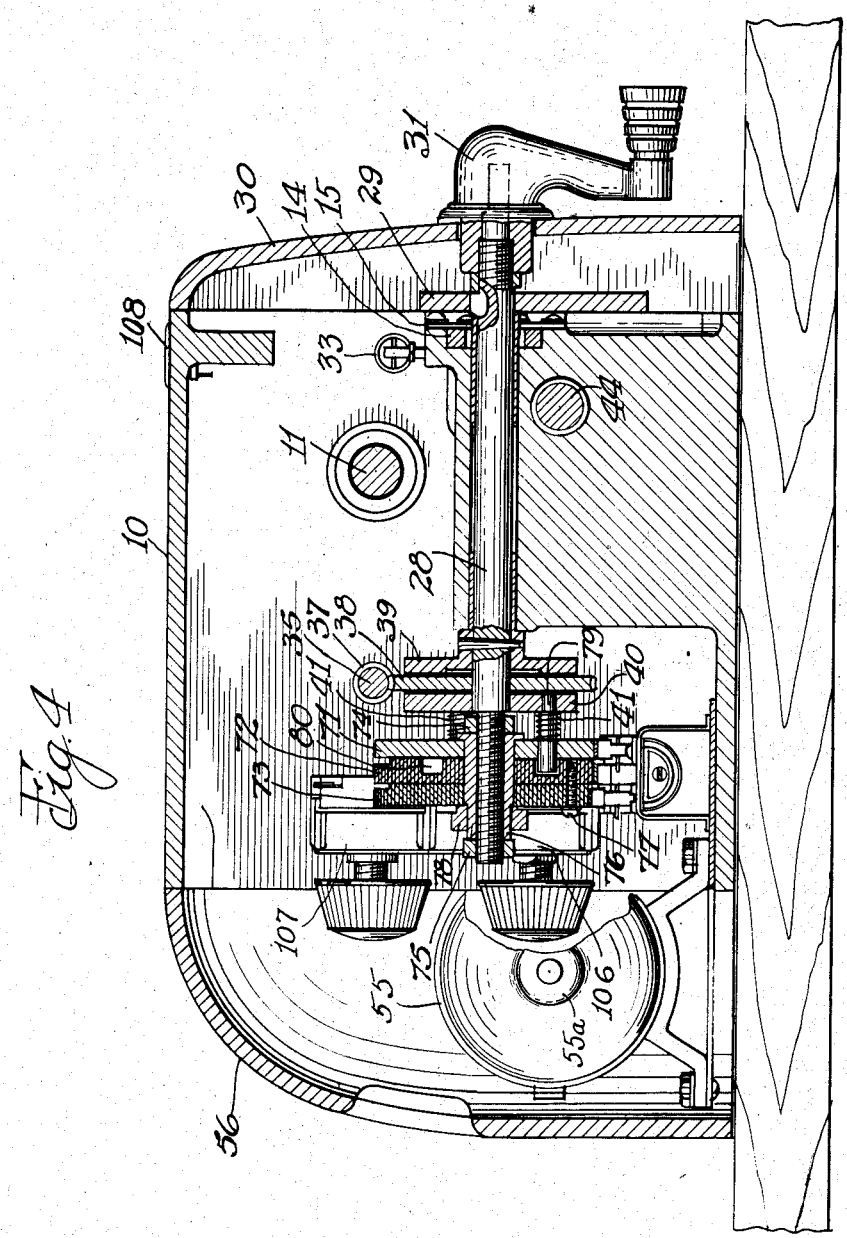
INVENTORS.
FREDERICK N. JACOB.
MARTIN J. KIRK.
BY   Albert C. Bell
ATTORNEY.

Dec. 15, 1942.　　　F. N. JACOB ET AL　　　2,305,085
MACHINE FOR WINDING ELECTRICAL COILS
Filed Oct. 4, 1940　　　8 Sheets-Sheet 5
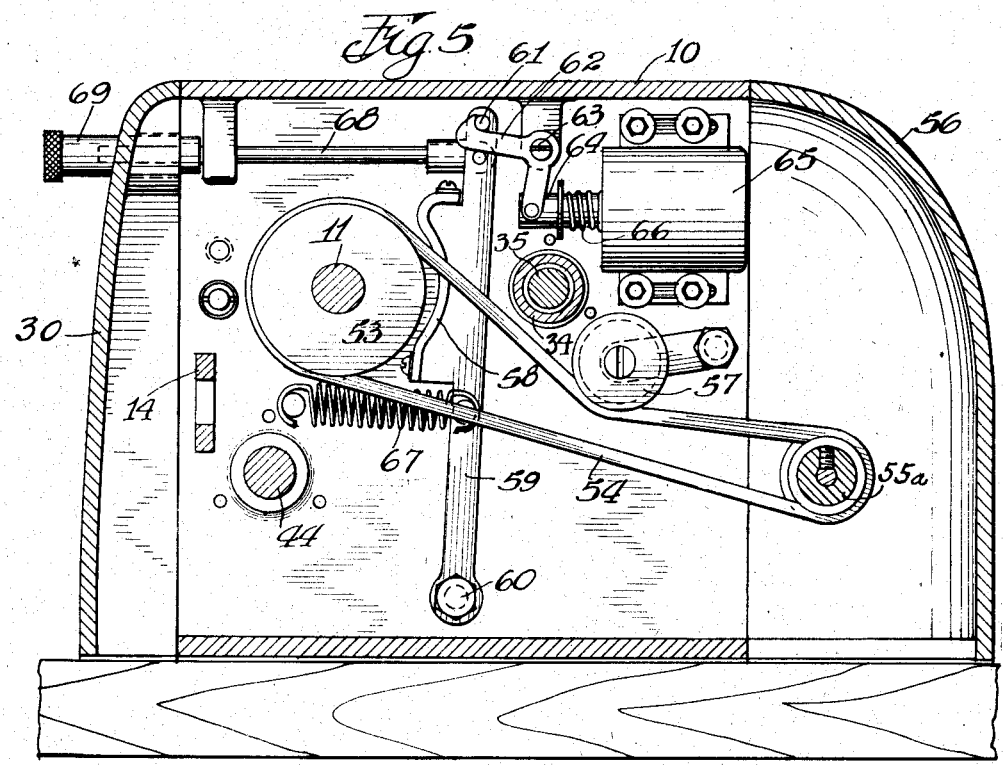
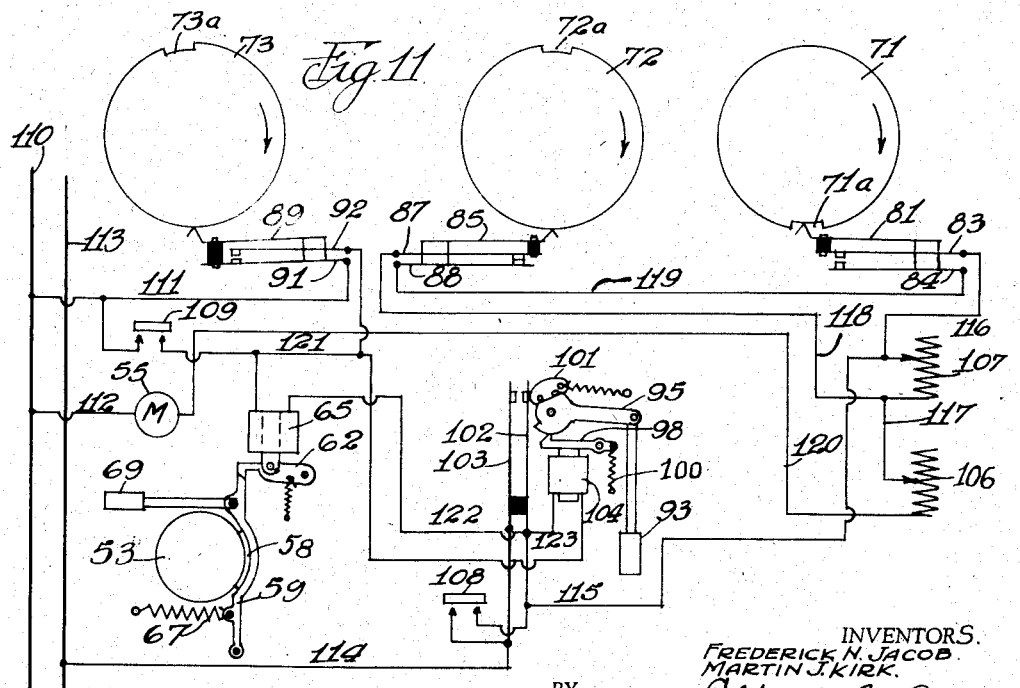
INVENTORS.
FREDERICK N. JACOB
MARTIN J. KIRK.
BY Albert C. Bell
ATTORNEY.

Dec. 15, 1942.    F. N. JACOB ET AL    2,305,085
MACHINE FOR WINDING ELECTRICAL COILS
Filed Oct. 4, 1940    8 Sheets-Sheet 6
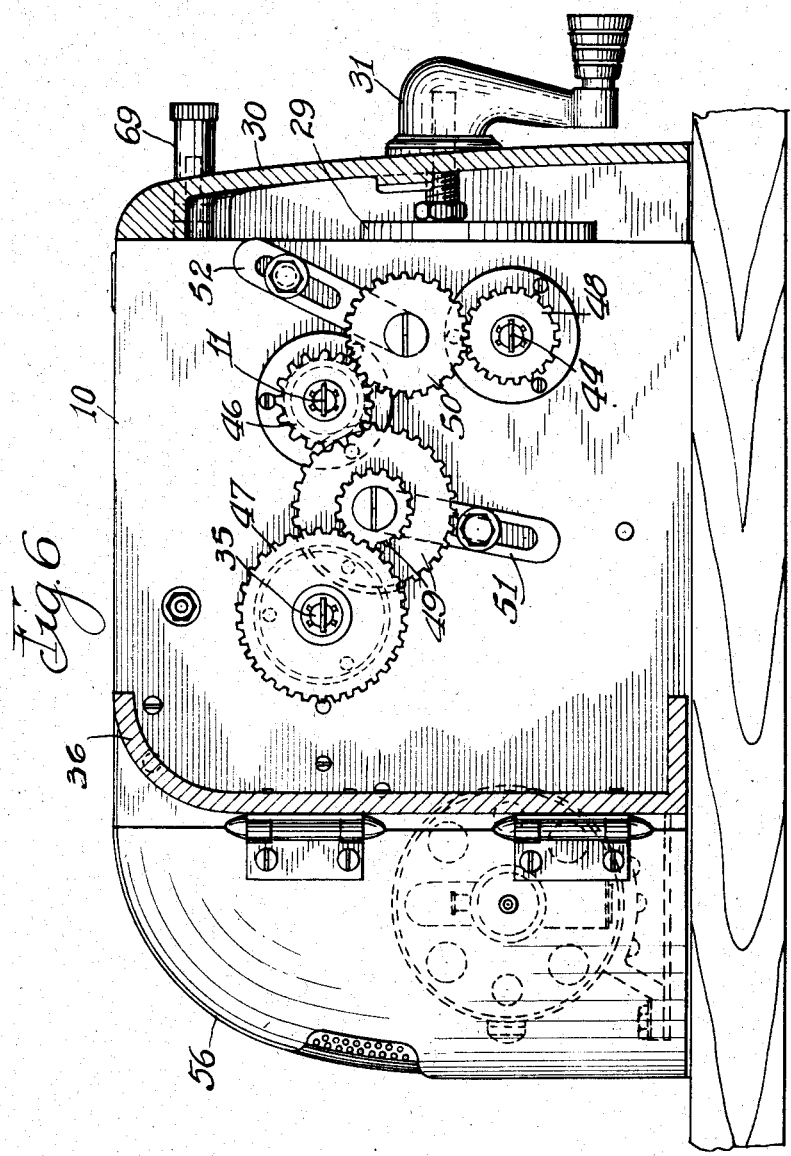
INVENTORS.
FREDERICK N. JACOB.
MARTIN J. KIRK.
BY Albert C. Bell
ATTORNEY.

Dec. 15, 1942.　　　F. N. JACOB ET AL　　　2,305,085
MACHINE FOR WINDING ELECTRICAL COILS
Filed Oct. 4, 1940　　　8 Sheets-Sheet 7
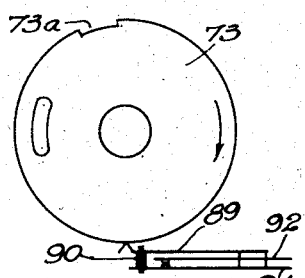
Fig. 9.
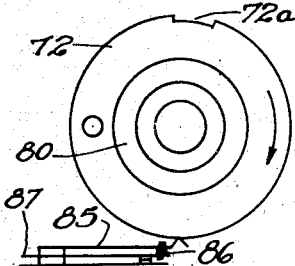
Fig. 8.
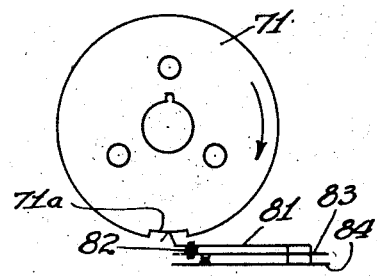
Fig. 7.
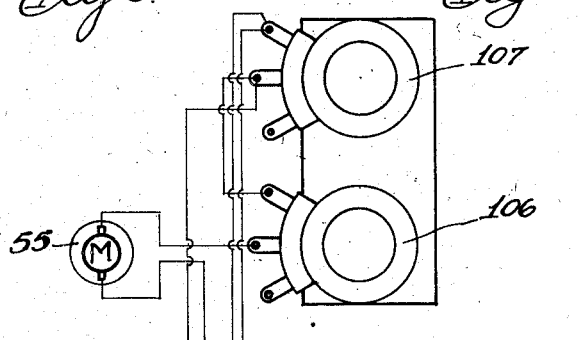
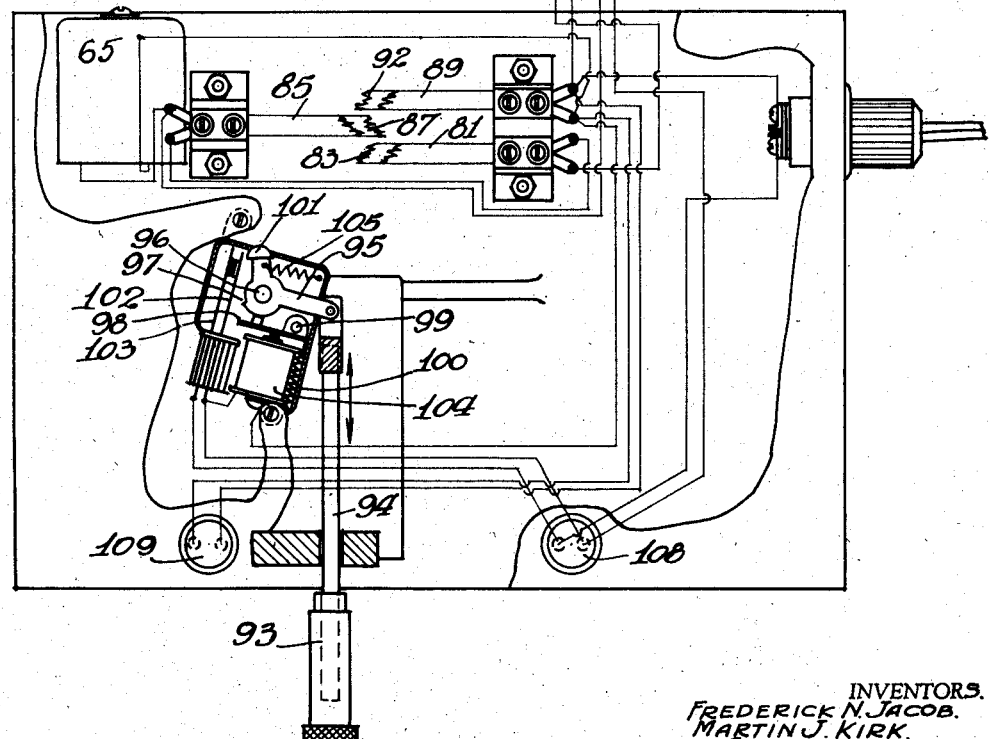
Fig. 10.
INVENTORS.
FREDERICK N. JACOB.
MARTIN J. KIRK.
BY Albert E. Bell
ATTORNEY.

Dec. 15, 1942.  F. N. JACOB ET AL  2,305,085

MACHINE FOR WINDING ELECTRICAL COILS

Filed Oct. 4, 1940  8 Sheets-Sheet 8

INVENTORS.
FREDERICK N. JACOB.
MARTIN J. KIRK.
BY Albert C. Bell
ATTORNEY.

Patented Dec. 15, 1942

2,305,085

UNITED STATES PATENT OFFICE 2,305,085

MACHINE FOR WINDING ELECTRICAL COILS

Frederick N. Jacob and Martin J. Kirk, Chicago, Ill., assignors to Johnson Laboratories, Inc., Chicago, Ill., a corporation of Illinois Application October 4, 1940, Serial No. 359,638

69 Claims. (Cl. 242—9)

This invention pertains to an improved construction of machine for winding inductance coils, for example for radio and allied purposes, and is particularly adapted to the winding of coils in which successive layers of winding are wound in overlapping or progressive fashion along a coil form so that the coils in general effect are of solenoid form but consist of successive layers, each of which layers may be of the universal type having a plurality of traverses, successive layers partially overlapping each other and to a desired extent as a result of the progressive winding of the coil axially of the coil form.

Our invention consists generically of a winding spindle for supporting the form on which the coil is to be wound, and a translatable wire guiding means comprising a carriage movable substantially parallel with the winding spindle, a follower rod carried by the carriage and in turn carrying a winding guide for directing the wire being wound to the coil on the spindle, a cam mechanism carried by and moving with the carriage for imparting reciprocating movement to the follower rod relatively to the carriage as and to the extent that may be desired in winding any particular type of coil, mechanism for moving the carriage progressively to successively wind different portions of the coil on the coil form, gearing connecting the winding spindle, the cam mechanism controlling the operation of the follower rod, and the mechanism for moving the carriage, so that the several parts will operate at desired relative speeds, a motor for driving the winding spindle, cam mechanism and carriage operating mechanism, and mechanism controlling the operation of the motor, which controlling mechanism preferably automatically establishes a condition of relatively slow operation of the winding spindle of predetermined extent at the beginning of the winding of a coil, and also establishes a second condition after winding the coil at a relatively high speed by which the winding spindle is driven at a relatively slow speed for a predetermined interval before the winding of the coil is completed, said control mechanism also preferably automatically stopping the winding operation when a coil consisting of a predetermined number of turns has been wound. By our invention the controlling mechanism referred to, is constructed so that the initial interval of relatively slow speed operation, the final intervial of relatively slow speed operation, and the total number of turns of the coil may be adjusted each independently of the other, means also being provided so that for any selected interval of slow speed operation, adjustment of the extent of slow speed operation at the end of the winding operation and adjustment of the total number of turns of the coil may be effected without changing the initial slow speed interval in any way, the adjusting devices being also preferably constructed so that when a certain final interval of slow speed operation at the end of the winding of a coil has been selected, this final interval may be maintained for adjustment of the controlling mechanism to wind coils having different numbers of total turns.

Where a reciprocating cam is employed and the carriage is moved progressively as described, because of the universal nature of each layer of the winding which may be effected by the machine and because of the progression of the layers in overlapping relation on the coil form, by which each layer overlaps to a desired extent the layer preceding it, the coils wound when the universal feature of the invention is operative, may be called progressive universal coils, it being understood that by simple changes in the connection of parts of the machine, the universal winding feature need not be employed, in which case the coils wound may be of the simple solenoid type; or if preferred, the wound coils may be of the pancake type, of the basket weave type, or universal coils of any type, and the wound coils may have uniform pitch in some cases and varied pitch in other cases, by suitably conforming interchangeable parts of the controlling mechanism.

By our invention the means employed to move the translatable carriage progressively in a direction substantially parallel with the winding spindle, consists preferably of a plate cam mounted on a control shaft, the operating edge surface of the plate cam being so arranged that the maximum travel of the carriage is effected for somewhat less than one complete rotation of the control shaft, the operation of the control shaft being by frictional driving means so that the control shaft may be moved to its initial position during which movement the carriage automatically moves to its initial winding position, without requiring operation of the other shafts and gearing of the machine in returning the carriage to its initial position. As a result of the limited movement imparted to the control shaft, the controlling mechanism referred to is preferably mounted on said control shaft and in a manner such that each part of the controlling mechanism is angularly adjustable on the control shaft to effect the several adjustments of the turns wound as above referred to.

It is therefore an object of our invention to produce a machine for winding coils of the progressive universal type, of such construction that the major portion of the coil may be wound at high speed, that a desired initial portion of the coil may be wound at slow speed, that a desired final portion of the coil may be wound at relatively slow speed, and that successive coils may be wound of the same number of total turns each, all of which is automatically effected by the controlling mechanism referred to.

The relatively slow operation at the beginning of the winding of a coil and the relatively slow operation at the end of the winding of a coil, insure accuracy in winding the beginning and end portions of the coil and also insure the stopping of the winding operation at precisely the instant desired, to the end that any desired number of total turns within the capacity of the machine may be accurately wound on a coil without thought on the part of the operator, and that successive coils wound by the machine may have the same number of turns and may in all respects be substantially identical with each other.

Heretofore where it has been desired to accurately wind coils to definite self-inductance values, or where it has been desired to accurately wind coils that are substantial duplicates of each other, the beginning of the operation while the machine is accelerating to its winding speed has either been subject to the judgment of the operator, or no control of any kind of said acceleration or initial winding period, has been employed, and a turn indicator has been relied upon to advise the operator when he should stop the winding operation by stopping the operation of the machine, and furthermore, it has been difficult if not impossible to accurately stop the winding of the coil at the exact instant that a desired number of turns has been wound, because of the difficulty of accurately reading the turn indicator to determine the exact instant at which to shut-off the driving of the machine, and because of the inertia of the rapidly moving parts of the machine making it impossible to instantly bring the moving parts to rest from their condition of rapid movement necessitated by the desired speed of winding the coil, which usually is as rapid as can be effectively used to lay the turns on the coil in the desired pattern. As a result of these limitations, in producing coils wound to accurate self-inductance values, and coils that are as closely as possible identical, it has heretofore been necessary after the winding operation, to test the coils electrically, for example, by a vacuum tube voltmeter, and to add or take off turns or parts thereof, until the desired self-inductance values, or other identity, is secured.

By the present invention, the difficulties referred to are overcome. The winding operation for successive coils of any given type and number of turns, is always started with the parts of the machine in the same position relatively to each other; when the operator starts the machine, an interval of slow operation is automatically provided by the machine which is not within the control of the operator, and which is sufficient to slowly accelerate the machine from a condition of rest to a moderate or slow winding speed, in a time interval sufficiently long to insure against relative displacement of any of the machine parts during said acceleration, and to insure against materially increasing the tension on the winding wire by said acceleration, above the tension established by the tensoning devices delivering the wire to the winding machine; the said time interval and speed of slow operation may be independently adjusted, in setting up the machine to wind any particular type and size of coil; at the end of the interval of slow speed operation, the speed of operation of the machine is automatically increased by devices in the machine, neither the time of the change of speed nor the rapid or normal speed of winding being within the control of the operator, the further acceleration to rapid or normal speed being at a rate insufficient to produce relative displacement of any of the machine parts and insufficient to materially increase the tension on the winding wire; the time interval and speed of rapid operation may be adjusted as desired, independently of each other, in setting up the machine to wind any particular type and size of coil; at the end of the interval of rapid operation, the speed of operation of the machine is automatically decreased by devices in the machine, neither the time of the change of speed nor the slower speed of winding being within the control of the operator, the deceleration to the slower speed being at a rate insufficient to materially decrease the tension on the winding wire; the time interval of the slower operation and the speed of said slower operation may be independently adjusted, in setting up the machine to wind any particular type and size of coil; at the end of the interval of slower operation, the operation of the machine is stopped practically instantly by devices in the machine which are not controlled by the operator, the stopping occurring with such precision as to wind on the coil exactly any desired number of turns and parts thereof; the time of stopping the machine and the total number of wound turns in the coil may be adjusted in setting up the machine to wind any particular type and size of coil.

By the invention, therefore, substantially identical coils may be wound, that are finished when the automatic winding by the machine is completed, without there being any need to measure the coils electrically or otherwise, or to modify the coils in any way, and all without the volition, judgment or any act on the part of the operator, excepting to insert a winding form or support, apply the winding wire, start the machine, and remove the wound coil after the machine stops.

Figure 13:
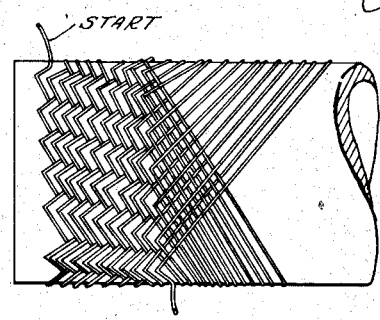

The above and other objects of our invention will more fully appear in connection with the drawings illustrating the same, which are as follows:

Fig. 1 is a front elevation of a preferred embodiment of our winding machine with the front cover removed, Fig. 2 is a horizontal, sectional view of the construction shown in Fig. 1 taken along the line 2—2 in Fig. 1, Fig. 3 is a vertical, sectional view of the construction shown in Fig. 2 taken along the line 3—3 in Fig. 2, Fig. 4 is a vertical, sectional view of the construction shown in Fig. 1 taken along the line 4—4 in Fig. 1, Fig. 5 is a vertical, sectional view of the construction shown in Fig. 1 taken along the line 5—5 in Fig. 1, Fig. 6 is a left-hand end elevation of the construction shown in Fig. 1 with the end cover of the machine removed, Figs. 7, 8 and 9 are vertical, sectional views of the controlling mechanism taken respectively along the lines 7—7, 8—8 and 9—9 in Fig. 2, Fig. 10 is a schematic view illustrating the circuit connections of the machine with the parts of the controlling mechanism in the relation they occupy in the machine, Fig. 11 is a simplified diagrammatic drawing of the wiring of the machine illustrating all of the devices involved in controlling the circuits of the machine, Fig. 12 is a simplified diagrammatic drawing similar to Fig. 11, but illustrating a modified arrangement of the speed controlling rheostats of the winding machine, Fig. 13 illustrates one type of coil capable of being wound on the winding machine disclosed.

Similar numerals refer to similar parts throughout the several views.

As shown in Figs. 1 and 2, the machine consists of a housing 10 supporting a winding shaft 11 in suitable bearings in its end walls, which shaft at its right-hand end supports a winding spindle 12 held in place in the end of the shaft by a clamping collar 13 so that different sizes of spindles may be employed as desired. The housing 10 also supports in front of the shaft 11 a carriage 14 comprising a flat bar of metal supported in vertical position substantially parallel with the shaft 11 in guideways therefor in the housing 10, in which guideways the carriage is held by retaining plates 15, 15 so that the carriage may move freely in said guideways in a direction substantially parallel with the shaft 11. As shown in Fig. 2, the carriage 14 has secured thereto blocks 16 and 17 supporting a follower rod 18 for free reciprocating movement, said follower rod being substantially parallel with the shaft 11 and spindle 12. The rod 18 has mounted thereon adjacent the spindle 12, wire guiding devices 19 which are readily movable angularly on the rod 18 but are prevented from longitudinal movement on said rod by collars 20, 20 carried by said rod. As more clearly shown in Fig. 3, the block 16 is provided below the rod 18 with a suitable bearing 21 supporting a cam 22 having an end cam surface engaged by a pin 23 rigidly secured to and extending downwardly from a collar 24 on the rod 18 as indicated in Fig. 2; the collar 24 is rigidly held in desired position on the rod 18 by a set-screw 25 which is extended as indicated in Fig. 1 through a clearance slot 25a therefor in the carriage 14, so that said set-screw may be conveniently operated from the front of the machine. The set-screw 25 also prevents turning of the rod 18, and holds the pin 23 in an angular position coincident with a radius of the cam surface of the cam 22. As shown in Fig. 2, the rod 18 is extended beyond the block 16 to carry a spring 26 which is held on said rod and against the block 16 by a collar 27 carried by the end of the rod. As a result of the construction described, rotation of the cam 22 by its engagement with pin 23, imparts a reciprocating movement to the rod 18 relatively to the carriage 14, of an amount and kind determined by the shape of the end cam surface of the cam 22, the bearing 21 being so constructed that the cam 22 is not movable axially relatively to the carriage 14. The spring 26 thus holds the rod 18 as far to the left as the engagement between the pin 23 and the cam 22 will permit, said spring at the same time permitting any desired movement of the rod 18 by the cam 22. The collar 24 is adjustable longitudinally of the rod 18 to secure a desired degree of tension of the spring 26 and also to adjust the pin 23 to properly engage any particular cam 22 that may be used with the winding machine.

As shown in Figs. 1 and 2, the housing 10 supports a rotary cross-shaft 28 in horizontal position below the winding shaft 11, which cross-shaft, as will be described, has mounted thereon the controlling mechanism of the machine, for which reason the shaft 28 may conveniently be referred to as the control shaft of the machine. The front end of the control shaft extends through a clearance opening 28a therefor in the carriage and has rigidly secured to its outer front end a plate cam 29, said shaft being extended beyond the plate cam to receive outside of the front cover 30 of the machine, a crank 31 for a purpose below described. The cam 29 illustrated in Fig. 1, is provided with an edge cam surface in the form of a spiral, so proportioned that the increase in radius of the cam surface is proportional to the angular displacement of the different radii of the cam. The carriage 14 has a pin 32 projecting from it and engaging the edge surface of the cam 29, and the carriage 14 has connected with it one end of a spring 33 the other end of which is secured to the left-hand end wall of the housing 10, which spring holds the pin 32 firmly against the edge surface of the cam 29 at all times. As a result of the construction just described, when the control shaft 28 and the cam 29 are rotated in the direction indicated by the arrow in Fig. 1, the pin 32 and the carriage 14 are moved to the right against the action of the spring 33, thereby correspondingly moving the wire guide 19, during which time the wire guide 19 may or may not be reciprocated in a direction axially of the winding spindle 12, depending on whether the cam 22 is or is not in operation. Furthermore, with the particular form of cam 29 described, if the rotation of the shaft 28 is uniform, the longitudinal movement of the carriage 14 to the right will also be uniform. With this construction, the result is that with the cam 22 in operation, during the winding of a coil, the carriage 14 is continuously moved in a direction to move the wire guide 19 towards the outer end of the winding spindle 12 and at the same time the wire guide 19 is reciprocated in a direction substantially parallel to the spindle 12 by the operation of the cam 22, to effect any desired number of traverses of the winding wire on the coil being wound, per layer or turn of said coil. It will be observed that whether the turns of the coil are provided with universal traverses or not, said turns by the operation of the cam 29 are laid on the coil form helically, and that the machine affords several operating conditions as follows:

If the cam 22 is not in operation, the turns of the coil are laid on the coil form helically and the coil is of the simple solenoid type; on the other hand, with the cam 22 in operation, if the carriage 14 is not in operation, the turns of the coil each containing a number of traverses determined by the construction of the cam 22, will be laid on the coil form one over the other to form a universal coil of usual construction; it will further be observed that our invention is not limited to, as the cam surface may have any desired form to effect any particular type of winding, for example, one part of the winding may be closely wound and another part or parts may be space wound where simple solenoids are wound, or, where the machine is employed to wind coils of the progressive universal type, one part of the coil may have a slow degree of progression or none at all, another part of the coil may have a rapid progression, and there may be as many changes of that kind in winding the coil as desired, all of which may be determined by the shape imparted to the edge cam surface of the cam 29.

As shown in Fig. 2, the housing 10 supports from its left-hand end wall, a bearing tube 34 supporting a worm shaft 35 for rotation, which shaft extends beyond the housing 10 and into the gear cover 36. The other end of the shaft 35 carries a worm 37, which worm meshes with a worm gear 38 on the control shaft 28. The worm gear 38 is not positively held against rotation on the shaft 28 but is supported on said shaft between a first disk 39 rigidly secured to said shaft and a pressure disk 40 on the opposite side of said worm gear and pressed towards said worm gear by springs 41. Thin rings 42 of suitable wearing material, for example Bakelite, are disposed between the worm gear 38 and the disks 39 and 40, and as a result of the action of the springs 41, rotation of the worm gear 38 by the worm 37 drives the control shaft 28 by the frictional engagement of the rings 42 with the worm gear 38 and the disks 39 and 40. This construction provides that for any operated condition of the carriage 14 by the rotation of the worm shaft 35, the carriage 14 may be returned to its initial position by means of the crank 31 without movement of the worm gear 38 and worm 37, which provides for quickly and easily establishing the initial position of the carriage after winding a first coil, so that a second coil may be wound without having in any way to operate the shafts and gearing of the machine excepting by the crank 31, as described. End motion of the worm shaft 35 in its bearings is prevented by collars 43, 43 carried by said shaft.

As shown in Fig. 3, the cam 22 is provided with an extending sleeve portion secured to the inner member of the bearing 21 to restrain the cam from axial movement relatively to the carriage 14. The cam and sleeve are provided with a bore which is a sliding fit on the cam shaft 44 supported in suitable bearings in the end walls of the housing 10 in substantially parallel relation with the carriage 14. The shaft 44 is provided with a keyway 44a slidably engaged by a key 45 carried by the cam 22. As a result, the cam may be moved freely longitudinally of the shaft 44 but is incapable of angular movement independently of said shaft, and rotation of the shaft drives the cam 22 for any position to which the carriage 14 may be moved by the operation of the cam 29. The end of the shaft 44 remote from the cam 22 extends through the housing 10 and into the gear cover 36.

As shown in Fig. 6, the ends of the shafts 11, 35 and 44 in the gear cover 36 are provided with gears 46, 47 and 48 connected by idler gears 49 and 50 supported by adjustable bar stud members 51 and 52 to permit securing any desired ratio of rotation between any of said shafts and the others thereof. Either or both of the idler gears may be of the compound type, particularly if a considerable difference in speed between the connected shafts is desired. From the construction described, it will be understood that the speed of rotation of the spindle shaft 11 is relatively high; that the speed of rotation of the cam shaft 44 may be of the same order as that of the shaft 11; and that the speed of rotation of the worm shaft 35 may require to be relatively slow, because of the entire rotary movement of the control shaft 28 being limited to something less than one full rotation of said shaft.

As shown in Fig. 5 the spindle shaft 11 has secured thereto a pulley 53 connected by a belt 54 with the pulley 55a of an electric motor 55 (Fig. 2), mounted back of the housing 10 in a motor cover 56. Desired tension is imparted to the belt 54 by an adjustable idler pulley 57. As shown in Fig. 2, the pulley 53 is extended axially, to constitute a brake drum for engagement by a brake shoe 58 carried by a brake bar pivotally supported at 60 from the housing 10. The upper end of the brake bar 59 is provided with a pin 61 for engagement with a bell crank latch 62 pivotally supported at 63 from the housing 10, the lower arm of said latch being pivotally connected with the movable core 64 of a solenoid 65. The core 64 is provided with a spring 66 normally holding said core in its outer position so that the latch 62 is in a position to engage the pin 61. The brake bar 59 is connected with one end of a spring 67, the other end of which is connected with the housing 10, the strength of the spring 67 being such that when the brake bar 59 is released from the latch 62 the brake shoe will be pressed against the brake drum with sufficient force to stop rotation of the winding shaft 11. The upper end of the brake bar 59 is pivotally connected with the inner end of a rod 68 carrying at its outer end a plunger 69 for actuation by the operator when it is desired to release the winding shaft 11 for operation by the motor 55. The solenoid 65 is energized in a manner to be described at the end of a coil winding operation, which withdraws the latch 62 from engagement with the pin 61, permitting the spring 67 to apply the brake to the spindle shaft 11. When it is desired to wind the next coil, the spindle shaft is released from the brake by inward movement of the plunger 69 so that the latch 62 engages the pin 61 to hold the brake in its releasing position. The plunger 69 extends through the front cover 30 employed to enclose the cam 29.

As shown in Fig. 2, the control shaft 28 carries three control disks 71, 72 and 73, which, as more clearly shown in Fig. 4, are secured to said shaft as follows: Outside of the pressure disk 40, the shaft 28 is of reduced diameter and threaded to receive adjusting nuts 74 and 75 between which a sleeve 76 is held on said shaft, said sleeve having a bore clearing the threads on the shaft. The control disk 71 is rigidly secured to said sleeve 76, or if preferred it may be integral with said sleeve. The control disks 72 and 73 are mounted for rotation on the sleeve 76, a screw 77 extending through a clearance slot therefor in the disk 73 and into the disk 72 to clamp the disks 72 and 73 together so that they may be adjusted as a unit when and as desired. The outer end of the sleeve 76 is threaded to receive a nut 78 which when tightened presses the disks 72 and 73 against the disk 71 to prevent movement of the disks 72 and 73 on the sleeve 76. In the construction shown, three equally spaced pressure springs 41 are employed between the pressure disk 40 and the control disk 71, which springs are supported on short rods 79 rigidly secured to the pressure disk 40 and extending with a sliding fit through suitable clearance openings in the control disk 71. The pins 79 preferably extend a small distance through the disk 71 and into a clearance groove 80 therefor in the side of the control disk 72. As a result of the construction described, in view of the pressure disk 39 being rigidly secured to the shaft 28 as indicated, the tension of the springs 41 may be adjusted as desired by releasing the nuts 74 and 75 and moving the sleeve 76 axially on the shaft 28 to either increase or decrease the tension of said springs, after which the nut 74 does not require further operation until and unless the frictional surfaces involved in driving the shaft 28 from the worm gear 38 become worn so as to require further adjustment of the springs 41. With the nut 74 in a position effecting desired adjustment of the springs 41, releasing the nut 75 permits the control disk 71 and the sleeve 76 to be rotated on the shaft 28 to effect any desired adjustment of said control disk, since the pressure disk 40 is rotatably supported on the shaft 28. When the disk 71 is in its desired adjustment, the nut 75 is tightened, with the result that the control disk 71 and the sleeve 76 are rigidly held against movement in any direction on the shaft 28, which results in communicating a part of the driving effort exerted by the worm gear 38 through the pressure plate 40, the pins 79 and the control disk 71, to the shaft 28, the remaining portion of the driving effort being exerted through the pressure disk 39 on said shaft 28. As below described, the control disk 71 is employed to control the initial interval or extent of winding at relatively slow speed, this control disk having nothing to do with other parts of the winding operation, as a result of which, when for any particular type or size of coil the desired initial interval or extent of winding at slow speed is decided upon, and the control disk 71 is adjusted for that interval, there is no need for further adjustment of the control disk 71, and the final interval of winding at slow speed and the total number of turns of the coil may be determined as desired by adjustment of the control disks 72 and 73 respectively, without releasing the control disk 71. Inasmuch as the final interval of winding at slow speed can conveniently be decided upon as a fixed interval, regardless of the total number of turns in said coils, and inasmuch as the number of final turns wound at slow speed is never large, the amount of adjustment required of the control disks 72 and 73 relatively to each other is not large and may readily be accommodated by the clearance slot in the control disk 73, when the screw 77 is released. After this number of final turns is decided upon and the disks 72 and 73 are relatively adjusted accordingly, said disks may be clamped together by the screw 77 and thereafter adjusted as a unit to secure different total numbers of turns of the coils to be wound. In any event, to effect adjustment of the control disks 72 and 73, the nut 78 on the sleeve 76 is loosened and when the disks 72 and 73 are given desired adjustment, the nut 78 is tightened, which prevents movement of the disks 72 and 73 relatively to the sleeve 76 and therefore relatively to the shaft 28.

As shown in Fig. 7, the control disk 71 is provided at one point in its periphery with a recess 71a and an operating spring 81 bearing against said periphery, so that when the disk is rotated, the spring 81 is in an outer position at all times excepting when its bent end is in engagement with the recess 71a, at which time the spring is in its inner or upper position. The spring 81 is connected by an insulating stud 82 with a first electric contact spring 83 cooperating with a second electric contact spring 84, the parts being so disposed that when the spring 81 is in its outer or lower position, the contact springs 83 and 84 are in electrical engagement with each other, and when the spring 81 is in its upper or inner position, the contact springs 83 and 84 are electrically separated from each other. In a manner to be described, the contact springs 83 and 84 control the speed of the motor 55 so that when they are in their closed condition the motor will operate at high speed and when they are separated from each other, as illustrated in Fig. 7, the motor will operate at a relatively slow speed. From this it will be understood that the disk 71 is adjusted to bring the recess 71a into position engaging the spring 81 in its upper position, when the control shaft 23 is in its position for starting the winding of a coil, the extent of angular movement of the disk 71 in the direction indicated by the arrow, permitted by its position in the recess 71a before said spring is depressed by riding onto the larger radius portion of the disk, determining the initial interval or extent of winding at relatively slow speed.

As shown in Fig. 8, the disk 72 is provided in its periphery with a recess 72a similar to the recess 71a in the disk 71, and the disk 72 cooperates with an operating spring 85 similar to the spring 81 and similarly controlling electric contact springs 87 and 88 through an insulating stud 86, the construction of the electric contact springs and their manner of operation being the same in all respects as described for the electric contact springs shown in Fig. 7. When the contact springs 87 and 88 are in their closed position they contribute in producing the same effect as the contact springs 83 and 84 in Fig. 7, and when the contact springs 87 and 88 are in their open or separated position, they effect relatively slow speed operation of the motor 55 in a manner to be described, which slow speed operation is to occur just before the winding of a coil is completed, as a result of which the control disk 72 is adjusted on the control shaft 28 so that the angular movement of the control disk 72 before the spring 85 will move upwardly into the recess 72a, is such that all of the turns will be then wound on the coil with the exception of the few final turns which are to be wound at relatively slow speed.

As shown in Fig. 9, the control disk 73 is provided with a recess 73a in its periphery which is similar to the recesses 71a and 72a, and an operating spring 89 is mounted below the disk so that it presses against the periphery of the disk excepting when the recess 73a is in its lowermost position, at which time the bent end of the spring 89 enters the recess to actuate the lower one, 91, of two electric contact springs through an insulating stud 90 so that with the spring 89 in the recess 73a the contact spring 91 will be in electrical engagement with a second electric contact spring 92, the contact springs 91 and 92 being separated from each other electrically by the spring 89 for all positions of the disk 73 excepting when the spring 89 is in the recess 73a. As below described, when the contact springs 91 and 92 are in their closed position, they close a circuit which stops the winding of a coil, as a result of which before a winding operation, the control disk 73 is adjusted angularly on the shaft 28, so that the leading edge of the recess 73a will engage the bent end of the spring 89 and will permit the spring to drop into said recess, at just the instant that the desired number of turns are wound on the coil. It will be observed that in view of the number of final turns desired to be wound at relatively slow speed being few in any event, the recesses 72a and 73a will generally overlap more or less angularly, because of it being necessary for the spring 85 to move into the recess 72a slightly in advance of the spring 89 moving into the recess 73a, the only requisite in this connection being that the recess 72a shall be long enough circumferentially so that whatever final interval of winding at relatively slow speed is desired, this will be accomplished with the spring 85 in the recess 72a before the spring 89 moves into the recess 73a.

As shown in Fig. 10, the winding machine is provided with devices for starting the operating of the motor at the beginning of a winding operation, and transferring control of said winding operation to the control disks 71, 72 and 73, as follows:

A starting plunger 93 is supported by the housing of the machine and connected with the outer end of a rod 94 the inner end of which is pivotally connected with a bell crank lever 95 pivotally supported at 96 and provided with an edge-notch 97 engaged by a latch 98 when the lever 95 is operated by the plunger 93. The latch 98 is pivotally supported at 99 and is held against the edge of the lever 95 by a spring 100. The other member of the bell crank lever 95 carries a block of insulating material 101 which, when the plunger 93 is actuated, engages a first electric contact spring 102 and presses said contact spring into engagement with a second electric contact spring 103, the contact springs 102 and 103 being located in the circuit of the motor 55 as below described. An electromagnet 104 is provided so that when energized it will attract the latch 98 and move it from engagement with the lever 95, at which time a retracting spring 105 moves the lever 95 to its initial position, permitting the contact spring 102 to move from engagement with the contact spring 103. Inasmuch as the lever 95 is locked in its operated position by the latch 98, it will be seen that the plunger 93 has no further control of the motor circuit during the winding of a coil, and that as far as the contact springs 102 and 103 are concerned, the winding operation will continue until the electromagnet 104 is energized.

As below pointed out, the electromagnet 104 as well as the solenoid 65 provided to release the brake, are controlled by the control disk 73. The winding machine is provided with a first rheostat 106 to adjust the motor speed to the desired high speed operation of the machine for any particular voltage conditions on the line supplying the motor with current, and with a second rheostat 107 to secure by its adjustment any desired low speed of operation. The winding machine is also provided with a push-button 108 for momentarily operating the motor in testing the machine or in leading the winding wire from its position of attachment to the winding spindle to its proper position for beginning the winding of a coil, the button 108 serving to operate the motor only as long as it is depressed, so that immediately upon releasing the button 108, the motor will stop. The winding machine is provided with a second push-button 109 as a precautionary measure so that if for any reason whatever, the operator desires to stop the machine before the automatic winding of a coil is completed, he may do so by depressing the button 109, which is so connected as below described, as to produce precisely the same result as when the spring 89 moves into the recess 73a in the control disk 73.

As shown diagrammatically in Fig. 11, the electrical connections of the winding machine are as follows:

The main supply conductor 110 is connected by wire 111 with one terminal of the push-button 109 and also with the contact spring 91 operated by the control disk 73, and is also connected by wire 112 with one terminal of the motor 55. The other main supply conductor 113 is connected by wire 114 with one terminal of the push-button 108 and also with contact spring 103. The other terminal of the push-button 108 is connected by wire 115 with the contact spring 102 and also with one terminal of the rheostat 107 and by wire 116 with the contact spring 83. The other terminal of the rheostat 107 is connected by wire 117 with one terminal of the rheostat 106 and by wire 118 with the contact spring 87. The contact springs 84 and 88 are connected together by wire 119. The other terminal of rheostat 106 is connected by wire 120 with the other terminal of the motor 55. The other terminal of the push-button 109 is connected by wire 121 with one terminal of the solenoid 65, with the contact spring 92 and also with one terminal of the electromagnet 104. The other terminals of the solenoid 65 and electromagnet 104 are connected together and with the contact spring 102 by wires 122 and 123. As a result of the connections described, when it is desired to start the automatic winding of a coil by means of the machine, the plunger 69 is first depressed, which releases the brake and engages the brake in its open or released condition by means of the latch 62. For this condition, depressing the push-button 108 will close the motor circuit as long as the push-button is held depressed, through the following path: Conductor 113, wire 114, push-button 108, wire 115, rheostat 107, wire 117, rheostat 106, wire 120, motor 55, wire 112 to the other supply conductor 110. When the push-button 108 is released, the circuit described is broken, so that the motor 55 is operated in this manner only for the time that the push-button is depressed. When the automatic winding of the coil is to be started, the plunger 93 is operated, which closes the contact springs 102 and 103 and holds them in closed condition by means of the latch 98. This closes the motor circuit through the following path: Supply conductor 113, wire 114, contact spring 103, contact spring 102, wire 115, rheostat 107, wire 117, rheostat 106, wire 120, motor 55, wire 112 back to the other supply conductor 110. It will be noted that this circuit is closed through both of the rheostats 106 and 107, thereby operating the motor at its relatively slow speed of operation. This condition continues until the control disk 71 has rotated sufficiently to move the recess 71a from angular alignment with the bent end of the operating spring 81 which closes the contact springs 83 and 84, thereby short-circuiting the rheostat 107 through wire 116, contact spring 83, contact spring 84, wire 119, contact spring 88, contact spring 87 and wire 118. It will be noted that at this time the contact springs 87 and 88 are in electrical contact with each other because of the disk 72 not having been rotated sufficiently to bring the recess 72a into alignment with the bent end of the operating spring 85. The short-circuiting of the rheostat 107 increases the speed of the motor 55 to its high speed of operation, which continues until the winding of the coil is nearly completed, at which time the leading edge of the recess 72a comes into angular alignment with the bent end of the operating spring 85 and the upward movement of the said operating spring separates the contacts 87 and 88 from engagement with each other, thereby opening the short-circuit above described around the rheostat 107 and including said rheostat in the circuit of the motor 55, which again establishes the slow speed of operation of the motor. At this time, the bent end of the operating spring 89 still rests on the outer periphery of the control disk 73, and the slow speed operation of the motor 55 continues until the leading edge of the recess 73a comes into angular alignment with the bent end of the spring 89, at which time the upward movement of the said operating spring brings contact springs 91 and 92 into electrical engagement with each other, completing the following circuit:

Supply conductor 113, wire 114, contact spring 103, contact spring 102, then in parallel through wires 122 and 123 to the solenoid 65 and the electromagnet 104, then through wire 121 to contact spring 92, contact spring 91, wire 111, and back to the other supply conductor 110. This energizes the solenoid 65 and the electromagnet 104 by current flow through contact springs 102 and 103, with the result that the latch 62 is operated to release the brake 59 which is at once applied to the drum 53 to stop rotation of the spindle shaft, the latch 98 being simultaneously operated to release the lever 95, which separates the contact springs 102 and 103, thereby interrupting the circuit above traced through the motor 55, as well as the circuits through solenoid 65 and the electromagnet 104 which prevents their overheating. The result of the operation of the spring 89 is therefore twofold: first, it results in the opening of the motor circuit and, second, it results in applying the brake to the spindle shaft of the machine to prevent rotation of said shaft. These effects cooperate to insure the immediate and effective stopping of the winding operation. It will be observed that the terminals of the push-button 109 are connected by wires 111 and 121 with the contact springs 91 and 92, as a result of which depressing the push-button 109 accomplishes precisely the same result electrically as is accomplished when the operating spring 89 is permitted to function by the movement of the recess 73a into alignment with the bent end of said operating spring.

In the arrangement shown in Fig. 12 the speed controlling rheostat 107 is replaced by two speed controlling rheostats 107a and 107b which are connected with the controlling mechanism and wiring as follows:

The upper end of the variable rheostat 107a is connected by wire 125 with the contact spring 83 associated with the control disk 71. The contact spring 84 associated with said disk is connected by wire 127 with the lower end of the rheostat 107a and also with the upper end of the variable rheostat 107b. The lower end of the rheostat 107b is connected with the upper end of the variable adjusting rheostat 106, and by wire 128 with the contact spring 87 associated with the control disk 72. The contact spring 88 associated with the control disk 72 is connected by wire 126 with wire 127. The wire 125 is connected with the wire 115 and the lower end of the rheostat 106 is connected with wire 120. Excepting as stated, the structure, wiring and operation of the mechanism shown in Fig. 12 is the same as that illustrated in Fig. 11. As a result of the construction described, it will be noted that the contact springs 87 and 88 determine whether the rheostat 107b is short-circuited, this condition existing when the contacts are in the closed position illustrated in Fig. 12, or whether on the other hand the said rheostat is not short-circuited because of the said contacts being in their open condition, and also that the contacts 83 and 84 similarly control the short-circuiting of the rheostat 107a through wires 125 and 127. As a result of the construction described, each of the rheostats 107a and 107b may be adjusted to secure any desired speed of operation of the motor 55, slower than its high speed operation controlled by the adjusting rheostat 106, independently of the adjustment of the other of said rheostats 107a and 107b, and in this manner the slow speed of operation effected by the rheostat 107a for an initial interval of the winding operation, may be any desired speed slower than that resulting from the high speed of operation of the motor, and the slow sped of winding for a final winding interval of the coils controlled by the disk 72, may have any desired speed of operation, less than that resulting from the high speed of operation of the motor 55, which may either be the same or different from the slow speed of operation effected by the control disk 71.

From the above it will be observed that by replacing the cam 29 by a circular disk having a stop lug for engagement with the pin 32, the carriage 14 will not have movement imparted to it. For this condition, the winding controls of the machine remain undisturbed and coils of any type may be wound by the machine by the operation of the cam mechanism 22, which may be of any kind and type which the cam mechanism carried by the carriage is capable of producing for the different possible constructions that may be given said cam mechanism. The same result may be secured without removing the cam 29, by applying a temporary stop or clamp to the carriage bar 14, holding said bar by its engagement with the housing 10, in its outermost position for which the pin 32 will engage the radial stop surface on the cam 29.

Again, with the shafts 11 and 35 operatively connected by the gearing 49, and with the gearing 50 removed, the plate cam 29 will be operated to move the carriage 14, without operation of the cam mechanism 22 carried by the carriage, for which condition the machine can wind coils of any kind capable of being produced by different designs and constructions of the plate cam 29. With both the gearing 49 and 50 in operative position as shown in Fig. 6, coils of any type may be produced which are the result of the combined operation of the cam mechanism 22 and the plate cam 29, for all possible operative conformations that may be given said cam structures.

It will be observed that different classes of coils may be wound by the machine, one class resulting from the action of the cam 22 without movement of the carriage 14, a second class resulting from movement of the carriage without operation of the wire guiding devices 19 by the cam 22, and a third class by the combined movement of the carriage and action of the cam 22; and that any coil of any class may be given any desired specific type and winding pattern by suitably shaping the cams 22 and 29. As a result, any type of coil capable of being machine wound, may be produced by the machine described.

In Fig. 13 we illustrate one type of progressive universal coil capable of being wound by the machine, which coil results from the particular proportions of making the axial distance of the traverse equal substantially to half of the diameter of the form on which the coil is wound, so taking the angular extent of the traverses that two successive traverses will have an angular extent around the winding form somewhat greater than the circumference of the winding form, and so taking the speed of the carriage relatively to the speed of rotation of the winding form, that each helical cycle of turns has but small displacement or progression axially from the next preceding cycle of helical turns. It will of course be understood that there may be in any particular case, as many traverses per turn of the winding form as desired, within practical limits; it will also be understood that the axial length of the traverses on the winding form may be of any extent desired within practical limits; and it will also be understood that the rate of progression of the successive helical cycles of turns may be as small or large as desired, producing corresponding amounts of overlap of successive helical cycles of turns. Thus many different forms of coils, having different appearances may be wound on the winding machine according to the requirements of different purposes for which the coils are to be used.

While we have shown our invention in the particular embodiment above described, it will be understood that we do not limit ourselves thereto as we may employ equivalents thereof without departing from the scope of the appended claims.

Having thus described our invention, what we claim is:

1. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, and devices for moving said carriage durng the winding of a coil, said carriage moving devices including a plate cam having an edge cam surface of varying radius, and a control shaft secured to and supporting said plate cam.

2. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, and devices for moving said carriage during the winding of a coil, said carriage moving devices including a plate cam having an edge cam surface of varying radius, a control shaft secured to and supporting said plate cam, a driving wheel on said shaft, and frictional driving means between said wheel and said shaft, whereby said plate cam may be turned to its starting position without turning said wheel.

3. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, and devices for moving said carriage during the winding of a coil, said carriage moving devices including a plate cam having an edge cam surface of varying radius, a control shaft secured to and supporting said plate cam, said carriage having a member engaging said cam surface, and a spring opposing movement of said carriage by said plate cam and holding said carriage member in engagement with said plate cam.

4. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, and controlling mechanism establishing said slow operating condition for an initial interval and then automatically establishing said fast operating condition of the motor.

5. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, and controlling mechanism establishing said slow operating condition for an initial interval and then automatically establishing said fast operating condition of the motor and also automatically establishing a condition stopping the winding operation when a predetermined number of turns has been wound on the coil.

6. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, and controlling mechanism establishing said slow operating condition for an initial interval and then automatically establishing said fast operating condition of the motor and again automatically establishing a slow operating condition for a final interval before the winding of the coil is completed and also automatically establishing a condition stopping the winding operation when a predetermined number of turns has been wound on the coil.

7. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices axially of said spindle and relatively to said carriage, devices for moving said carriage during the winding of a coil, a motor operatively connected with said winding spindle, said cam mechanism and said carriage moving devices, and controlling mechanism driven by said motor proportionally to said spindle movement and establishing a condition stopping the winding operation when a predetermined number of turns has been wound on the coil.

8. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices axially of said spindle and relatively to said carriage, devices for moving said carriage during the winding of a coil, a motor operatively connected with said winding spindle, said cam mechanism and said carriage moving devices, and controlling mechanism driven by said motor proportionally to said spindle movement and establishing a condition stopping the winding operation when a predetermined number of turns has been wound on the coil, said controlling mechanism being adjustable to provide for winding coils having different desired numbers of turns.

9. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices, and controlling mechanism automatically establishing a condition stopping the winding operation when a predetermined number of turns has been wound on the coil, said motor having slow and fast operating conditions, said controlling mechanism automatically establishing said fast operating condition for the winding of the coil and also automatically establishing said slow operating condition for a final interval before the winding of the coil is completed.

10. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices relatively to said carriage and axially of said spindle, devices for moving said carriage during the winding of a coil, a brake for stopping rotation of said winding spindle, and controlling mechanism automatically establishing a condition applying said brake when a predetermined amount of movement of said carriage has been effected.

11. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a brake for stopping rotation of said winding spindle, a motor operatively connected with said winding spindle and said carriage moving devices, and controlling mechanism automatically establishing a condition applying said brake when a predetermined number of turns has been wound on the coil.

12. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a brake for stopping rotation of said winding spindle, a motor operatively connected with said winding spindle and said carriage moving devices, and controlling mechanism automatically establishing a condition applying said brake when a predetermined number of turns has been wound on the coil and at the same time opening the motor circuit.

13. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, controlling mechanism establishing said slow operating condition for a final interval before the winding of the coil is completed, and a brake for stopping rotation of said winding spindle, said controlling mechanism also automatically establishing a condition applying said brake when a predetermined number of turns has been wound on the coil.

14. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, controlling mechanism establishing said slow operating condition for an initial interval and then automatically establishing said fast operating condition of the motor, and a brake for stopping rotation of said winding spindle, said controlling mechanism also automatically establishing a condition applying said brake when a predetermined number of turns has been wound on the coil.

15. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, controlling mechanism establishing said slow operating condition for an initial interval and then automatically establishing said fast operating condition of the motor and again automatically establishing a slow operating condition for a final interval before the winding of the coil is completed and also automatically establishing a condition stopping the winding operation when a predetermined number of turns has been wound on the coil, and a brake for stopping rotation of said winding spindle, said controlling mechanism also automatically establishing a condition applying said brake when a predetermined number of turns has been wound on the coil.

16. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, controlling mechanism establishing said slow operating condition for an initial interval and then automatically establishing said fast operating condition of the motor and again automatically establishing a slow operating condition for a final interval before the winding of the coil is completed and also automatically establishing a condition stopping the winding operation when a predetermined number of turns has been wound on the coil, and a brake for stopping rotation of said winding spindle, said controlling mechanism also automatically establishing a condition applying said brake when a predetermined number of turns has been wound on the coil, said controlling mechanism being adjustable to provide for winding coils having different desired numbers of turns.

17. In a coil winding machine, the combination of a rotary winding spindle for receiving a support for a coil to be wound, a carriage movable longitudinally of said spindle and carrying wire guiding devices, rotary cam mechanism carried by said carriage for reciprocating said wire guiding devices along said spindle, devices for moving said carriage during the winding of a coil, a motor operatively connected with said winding spindle and said carriage moving devices and having slow and fast operating conditions, controlling mechanism establishing said slow operating condition for an initial interval and then automatically establishing said fast operating condition of the motor and again automatically establishing a slow operating condition for a final interval before the winding of the coil is completed and also automatically establishing a condition stopping the winding operation when a predetermined number of turns has been wound on the coil, and a brake for stopping rotation of said winding spindle, said controlling mechanism also automatically establishing a condition applying said brake when a predetermined number of turns has been wound on the coil and at the same time opening the motor circuit.

18. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil.

19. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said first devices including switching mechanism and a resistance in the motor circuit and controlled by said switching mechanism.

20. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said second devices including switching mechanism and a resistance in the motor circuit and controlled by said switching mechanism.

21. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said first devices including first switching mechanism controlling a resistance in the motor circuit, and said second devices including second switching mechanism also controlling a resistance in the motor circuit.

22. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said third devices including switching mechanism controlling the circuit of said motor.

23. As a means for controlling the operation of a coil winding machine which includes a winding spindle, a motor for droving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said third devices including a brake for said spindle, and switching mechanism controlling the operation of said brake.

24. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, second devices establishing a slow speed of said spindle for a final interval before the coil winding operation is completed, and third devices stopping rotation of said spindle when a predetermined number of turns has been wound on the coil, said third devices including a brake for said spindle, and switching mechanism controlling the operation of said brake, said switching mechanism also controlling the circuit of said motor.

25. As a means for controlling the operation of a coil winding machine which includes a winding spindle, a motor for driving said spindle, and wire guiding devices for directing the winding wire to a coil support on said spindle, the combination of first devices driven by said motor and establishing first a slow speed of said spindle for an initial interval and then a relatively rapid speed of said spindle, and second devices driven by said motor and stopping rotation of said spindle when a predetermined number of turns has been wound on the coil.

26. As a means for controlling the operation of a coil winding machine which includes a winding spindle, a motor for driving said spindle, and wire guiding devices for directing the winding wire to a coil support on said spindle, the combination of first devices driven by said motor and establishing first a slow speed of said spindle for an initial interval and then a relatively rapid speed of said spindle, and second devices driven by said motor and stopping rotation of said spindle when a predetermined number of turns has been wound on the coil, said first devices including switching mechanism and a resistance in the motor circuit and controlled by said switching mechanism.

27. As a means for controlling the operation of a coil winding machine which includes a winding spindle, a motor for driving said spindle, and wire guiding devices for directing the winding wire to a coil support on said spindle, the combination of first devices driven by said motor and establishing first a slow speed of said spindle for an initial interval and then a relatively rapid speed of said spindle, and second devices driven by said motor and stopping rotation of said spindle when a predetermined number of turns has been wound on the coil, said second devices including switching mechanism controlling the circuit of said motor.

28. As a means for controlling the operation of a coil winding machine which includes a winding spindle, a motor for driving said spindle, and wire guiding devices for directing the winding wire to a coil support on said spindle, the combination of first deivces establishing first a slow speed of said spindle for an initial interval and then a relatively rapid speed of said spindle, and second devices stopping rotation of said spindle when a predetermined number of turns has been wound on the coil, said second devices including a brake for said spindle, and switching mechanism controlling the operation of said brake.

29. As a means for controlling the operation of a coil winding machine which includes a winding spindle, a motor for driving said spindle, and wire guiding devices for directing the winding wire to a coil support on said spindle, the combination of first devices establishing first a slow speed of said spindle for an initial interval and then a relatively rapid speed of said spindle, and second devices stopping rotation of said spindle when a predetermined number of turns has been wound on the coil, said second devices including a brake for said spindle, and switching mechanism controlling the operation of said brake, said switching mechanism also controlling the circuit of said motor.

30. As a means for controlling the operation of a coil winding machine which includes a winding spindle, a motor for driving said spindle, and wire guiding devices for directing the winding wire to a coil support on said spindle, the combination of means for driving said spindle at a relatively rapid speed, first devices driven by said motor and establishing a slow speed of said spindle for a final interval before the coil winding operation is completed, and second devices driven by said motor and stopping rotation of said spindle when a predetermined number of turns has been wound on the coil.

31. As a means for controlling the operation of a coil winding machine which includes a winding spindle, a motor for driving said spindle, and wire guiding devices for directing the winding wire to a coil support on said spindle, the combination of means for driving said spindle at a relatively rapid speed, first devices establishing a slow speed of said spindle for a final interval before the coil winding operation is completed, and second devices stopping rotation of said spindle when a predetermined number of turns has been wound on the coil, said first devices including switching mechanism and a resistance in the motor circuit and controlled by said switching mechanism.

32. As a means for controlling the operation of a coil winding machine which includes a winding spindle, a motor for driving said spindle, and wire guiding devices for directing the winding wire to a coil support on said spindle, the combination of means for driving said spindle at a relatively rapid speed, first devices establishing a slow speed of said spindle for a final interval before the coil winding operation is completed, and second devices stopping rotation of said spindle when a predetermined number of turns has been wound on the coil, said second devices including switching mechanism controlling the circuit of said motor.

33. As a means for controlling the operation of a coil winding machine which includes a winding spindle, a motor for driving said spindle, and wire guiding devices for directing the winding wire to a coil support on said spindle, the combination of means for driving said spindle at a relatively rapid speed, first devices establishing a slow speed of said spindle for a final interval before the coil winding operation is completed, and second devices stopping rotation of said spindle when a predetermined number of turns has been wound on the coil, said second devices including a brake for said spindle, and switching mechanism controlling the operation of said brake.

34. As a means for controlling the operation of a coil winding macchine which includes a winding spindle, a motor for driving said spindle, and wire guiding devices for directing the winding wire to a coil support on said spindle, the combination of means for driving said spindle at a relatively rapid speed, first devices establishing a slow speed of said spindle for a final interval before the coil winding operation is completed, and second devices stopping rotation of said spindle when a predetermined number of turns has been wound on the coil, said second devices including a brake for said spindle, and switching mechanism controlling the operation of said brake, said switching mechanism also controlling the circuit of said motor.

35. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machcine.

36. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said macchine, said controlling devices including a cam disk on said control shaft and switching mechanism actuated by said cam disk and increasing the speed of the motor after an initial winding interval.

37. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk and increasing the speed of the motor after an initial winding interval, said cam disk being angularly adjustable on said control shaft to change the duration of said initial winding interval as desired.

38. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk and decreasing the speed of the motor for a final interval before the winding of the coil is completed.

39. In a coil winding macchine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machcine, said controlling devices including a cam disk on said control shaft and switching mechanism actuated by said cam disk and decreasing the speed of the motor for a final interval before the winding of the coil is completed, said cam disk being angularly adjustable on said control shaft to change the duration of said final interval as desired.

40. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk to open the circuit of the motor when a coil having a desired number of turns has been wound.

41. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk to open the circuit of the motor when a coil having a desired number of turns has been wound, said cam disk being angularly adjustable on said control shaft to change the number of said coil turns as desired.

42. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle.

43. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake.

44. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake, said cam disk being adjustable angularly on said control shaft to change the time of application of said brake as desired.

45. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake and to open the circuit of the motor.

46. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake and to open the circuit of the motor, said cam disk being adjustable angularly on said control shaft to change the time of application of said brake and the opening of the motor circuit as desired.

47. In a coil winding machine, the combination of a winding spindle, a carriage movable longitudinally of said spindle, and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including first and second cam disks on said control shaft and individual first and second switching mechanisms respectively actuated by said cam disks, said first switching mechanism effecting an increase in speed of the motor after an initial winding interval, and said second switching mechanism stopping the winding operation when a coil having a desired number of turns is wound.

48. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, said controlling devices including first and second cam disks on said control shaft and individual first and second switching mechanisms respectively actuated by said cam disks, said first switching mechanism effecting an increase in speed of the motor after an initial winding interval, and said second switching mechanism stopping the winding operation when a coil having a desired number of turns is wound, and devices adjustably securing said cam disks to said control shaft in desired angular relation to said control shaft and to each other, whereby the duration of the control exercised by each of said cam disks may be adjusted as desired independently of the other of said cam disks.

49. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, said controlling devices including first and second cam disks on said control shaft and individual first and second switching mechanisms respectively actuated by said cam disks, said first switching mechanism effecting an increase in speed of the motor after an initial winding interval, and said second switching mechanism stopping the winding operation when a coil having a desired number of turns is wound, first devices adjustably securing said first cam disk to said control shaft to change the duration of said initial winding interval as desired, and second devices independent of said first devices and adjustably securing said second cam disk to said control shaft to change the number of turns of a wound coil as desired without releasing said first cam disk from said control shaft.

50. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake, said controlling devices also including a second cam disk on said control shaft and second switching mechanism actuated by said second cam disk and decreasing the speed of the motor for a final interval prior to the application of said brake.

51. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake, said controlling devices also including a second cam disk on said control shaft and second switching mechanism actuated by said second cam disk and decreasing the speed of the motor for a final interval prior to the application of said brake, said second cam disk being angularly adjustable on said control shaft to change the duration of said final interval as desired.

52. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a first cam disk on said control shaft and first switching mechanism actuated by said cam disk to control the application of said brake, said cam disk being adjustable angularly on said control shaft to change the time of application of said brake as desired, said controlling devices also including a second cam disk on said control shaft and second switching mechanism actuated by said second cam disk and decreasing the speed of the motor for a final interval prior to the application of said brake, said second cam disk being angularly adjustable on said control shaft relatively to said first cam disk to change the duration of said final interval as desired.

53. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a first cam disk on said control shaft and first switching mechanism actuated by said cam disk to control the application of said brake, said cam disk being adjustable angularly on said control shaft to change the time of application of said brake as desired, said controlling devices also including a second cam disk on said control shaft and second switching mechanism actuated by said second cam disk and decreasing the speed of the motor for a final interval prior to the application of said brake, said second cam disk being angularly adjustable on said control shaft relatively to said first cam disk to change the duration of said final interval as desired, and devices for securing said cam disks together in desired adjusted relation to each other and at the same time permitting angular adjustment of said cam disks as a unit on said control shaft, whereby the time of application of the brake may be changed as desired while maintaining the duration of said final interval.

54. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake and to open the circuit of the motor, said controlling devices also including a second cam disk on said control shaft and second switching mechanism actuated by said second cam disk and decreasing the speed of the motor for a final interval prior to the application of said brake and the opening of the motor circuit.

55. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a cam disk on said control shaft and switching mechanism actuated by said cam disk to control the application of said brake and to open the circuit of the motor, said controlling devices also including a second cam disk on said control shaft and second switching mechanism actuated by said second cam disk and decreasing the speed of the motor for a final interval prior to the application of said brake and the opening of the motor circuit, said second cam being angularly adjustable on said control shaft to change the duration of said final interval as desired.

56. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, and a brake for stopping rotation of said winding spindle, said controlling devices including a first cam disk on said control shaft and first switching mechanism actuated by said cam disk to control the application of said brake and to open the circuit of the motor, said cam disk being adjustable angularly on said control shaft to change the time of application of said brake and the opening of the motor circuit as desired, said controlling devices also including a second cam disk on said control shaft and second switching mechanism actuated by said second cam disk and decreasing the speed of the motor for a final interval prior to the application of said brake and the opening of the motor circuit, said second cam disk being angularly adjustable on said control shaft relatively to said first cam disk to change the duration of said final interval.

57. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, a brake for stopping rotation of said winding spindle, said controlling devices including a first cam disk on said control shaft and first switching mechanism actuated by said cam disk to control the application of said brake and to open the circuit of the motor, said cam disk being adjustable angularly on said control shaft to change the time of application of said brake and the opening of the motor circuit as desired, said controlling devices also including a second cam disk on said control shaft and second switching mechanism actuated by said second cam disk and decreasing the speed of the motor for a final interval prior to the application of said brake and the opening of the motor circuit, said second cam disk being angularly adjustable on said control shaft relatively to said first cam disk to change the duration of said final interval, and devices for securing said cam disks together in desired adjusted relation to each other and at the same time permitting angular adjustment of said cam disks as a unit on said control shaft, whereby the time of application of the brake and the opening of the motor circuit may be changed as desired while maintaining the duration of said final interval.

58. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk to open the circuit of the motor when a coil having a desired number of turns has been wound, said controlling devices also including a second cam disk on said control shaft and second switching mechanism actuated by said second cam disk and decreasing the speed of the motor for a final interval prior to the opening of the motor circuit.

59. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, and controlling devices in part carried by said control shaft for controlling the operation of said machine, said controlling devices including a cam disk on said control shaft and switching mechanism actuated by said cam disk to open the circuit of the motor when a coil having a desired number of turns has been wound, said controlling devices also including a second cam disk on said control shaft and second switching mechanism actuated by said second cam disk and decreasing the speed of the motor for a final interval prior to the opening of the motor circuit, said second cam being angularly adjustable on said control shaft to change the duration of said final interval as desired.

60. In a coil winding machine, the combination of a winding spindle, a carriage movable longitudinally of said spindle and carrying wire guiding devices, rotary cam mechanism carried by said carriage for reciprocating said wire guiding devices along said spindle, a control shaft limited to less than one rotation for the maximum movement in one direction of said carriage, devices operatively connecting said control shaft and said carriage, gearing connecting said spindle, said cam mechanism and said control shaft for operation at desired speeds, a motor for driving said spindle, controlling devices in part carried by said control shaft for controlling the operation of said machine, said controlling devices including a cam disk on said control shaft and switching mechanism actuated by said cam disk to open the circuit of the motor when a coil having a desired number of turns has been wound, said controlling devices also including a second cam disk on said control shaft and second switching mechanism actuated by said second cam disk and decreasing the speed of the motor for a final interval prior to the opening of the motor circuit, and devices for securing said cam disks together in desired adjusted relation to each other and at the same time permitting angular adjustment of said cam disks as a unit on said control shaft, whereby the total number of turns of the wound coil may be changed as desired while maintaining the duration of said final interval.

61. In a coil winding machine, the combination of a winding mechanism having a rotatable winding spindle and a translatable carriage with filament guiding means thereon, common operating means for rotating said spindle and correspondingly translating said carriage, said machine having a winding cycle comprising a predetermined number of rotations of said spindle, and speed changing devices operating in synchronism with the rotation of said spindle for changing the speed of rotation of said spindle at a predetermined intermediate point in the cycle of operation of the machine.

62. In a coil winding machine, the combination of a winding mechanism having a rotatable winding spindle and a translatable carriage with filament guiding means thereon, common operating means for rotating said spindle and correspondingly translating said carriage, said machine having a winding cycle comprising a predetermined number of rotations of said spindle, speed changing devices operating in synchronism with the rotation of said spindle for changing the speed of rotation of said spindle at a predetermined intermediate point in the cycle of operation of the machine, and devices for changing as desired said point of speed change within said winding cycle.

63. In a coil winding machine, the combination of a winding mechanism having a rotatable winding spindle and a translatable carriage with filament guiding means thereon, common operating means for rotating said spindle and correspondingly translating said carriage in but one direction, said machine having a winding cycle comprising a predetermined number of rotations of said spindle, and speed changing devices actuated by rotation of said spindle for changing the speed of rotation of said spindle at each of two predetermined points in the cycle of operation of the machine, said points of speed change being spaced in said cycle from each other and also from the ends of said cycle.

64. In a coil winding machine, the combination of a winding mechanism having a rotatable winding spindle and a translatable carriage with filament guiding means thereon, common operating means for rotating said spindle and correspondingly translating said carriage, said machine having a winding cycle comprising a predetermined number of rotations of said spindle, speed changing devices operating in synchronism with rotation of said spindle for changing the speed of rotation of said spindle at each of two predetermined points in the cycle of operation of the machine, said points of speed change being spaced in said cycle from each other and also from the ends of said cycle, and devices for changing as desired the relation between said points of speed change while maintaining unchanged the relation of each of said points of speed change to the corresponding end of the winding cycle.

65. In a coil winding machine, the combination of a winding mechanism having a rotatable winding spindle and a translatable carriage with filament guiding means thereon, common operating means for rotating said spindle and correspondingly translating said carriage, said machine having a winding cycle comprising a predetermined number of rotations of said spindle, speed changing devices operating in synchronism with rotation of said spindle for changing the speed of rotation of said spindle at each of two predetermined points in the cycle of operation of the machine, said points of speed change being spaced in said cycle from each other and also from the ends of said cycle, and devices for changing as desired the relation of said points of speed change to each other and to the ends of the winding cycle.

66. In a coil winding machine, the combination of a winding mechanism having a rotatable winding spindle and a translatable carriage with filament guiding means thereon, common operating means for rotating said spindle and correspondingly translating said carriage in one direction, said machine having a winding cycle comprising a predetermined number of rotations of said spindle, speed changing devices operating in synchronism with the rotation of said spindle for changing the speed of rotation of said spindle at each of two predetermined intermediate points in the cycle of operation of the machine, said points of speed change being spaced in said cycle from each other and also from the ends of said cycle, and means for returning said carriage to the starting point of said cycle.

67. In a coil winding machine, the combination of a winding mechanism having a rotatable winding spindle and a translatable carriage with filament guiding means thereon, common operating means for rotating said spindle and correspondingly translating said carriage in one direction, said machine having a winding cycle comprising a predetermined number of rotations of said spindle, speed changing devices operating in synchronism with the rotation of said spindle for changing the speed of rotation of said spindle at a single predetermined intermediate point in the cycle of operation of the machine, said point of speed change being spaced in said cycle from the ends of said cycle, and means for returning said carriage to the starting point of said cycle.

68. In a coil winding machine, the combination of a winding mechanism having a rotatable winding spindle and a translatable carriage with filament guiding means thereon, common operating means for rotating said spindle and correspondingly translating said carriage in one direction, said machine having a winding cycle comprising a predetermined number of rotations of said spindle, speed changing devices operating in synchronism with the rotation of said spindle for changing the speed of rotation of said spindle at each of two predetermined intermediate points in the cycle of operation of the machine, said points of speed change being spaced in said cycle from each other and also from the ends of said cycle, means for returning said carriage to the starting point of said cycle, and devices for changing the number of spindle rotations of said winding cycle and maintaining the relation of one of said points of speed change to one of the end points of said winding cycle.

69. In a coil winding machine, the combination of a winding mechanism having a rotatable winding spindle and a translatable carriage with filament guiding means thereon, common operating means for rotating said spindle and correspondingly translating said carriage in one direction, said machine having a winding cycle comprising a predetermined number of rotations of said spindle, speed changing devices operating in synchronism with the rotation of said spindle for changing the speed of rotation of said spindle at a predetermined intermediate point in the cycle of operation of the machine, said point of speed change being spaced in said cycle from the ends of said cycle, devices for changing the number of spindle rotations of said winding cycle and maintaining the relation of said point of speed change to one of the ends of said winding cycle, and means for returning said carriage to the starting point of said cycle.

FREDERICK N. JACOB.
MARTIN J. KIRK.